United States Patent
Ding (10) Patent No.: US 6,351,576 B1
(45) Date of Patent: Feb. 26, 2002

(54) OPTICAL CLOCKING DISTRIBUTION USING DIFFRACTIVE METAL MIRRORS AND METAL VIA WAVEGUIDES

(75) Inventor: Yi Ding, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,936

(22) Filed: Dec. 23, 1999

(51) Int. Cl.[7] .............................. G02B 6/12; G06F 1/04
(52) U.S. Cl. .......................... 385/14; 385/24; 385/109; 385/130; 385/131; 395/556; 395/555; 395/557; 395/558; 395/559
(58) Field of Search .......................... 385/14, 24, 129, 385/130, 131; 395/555, 556, 557, 558, 559

(56) References Cited

U.S. PATENT DOCUMENTS

| | | | | |
|---|---|---|---|---|
| 5,208,879 A | * | 5/1993 | Gallo et al. ..................... 385/14 |
| 5,373,570 A | * | 12/1994 | Menigaux et al. ............. 385/14 |
| 5,416,861 A | * | 5/1995 | Koh et al. ...................... 385/14 |
| 5,508,835 A | * | 4/1996 | Takahashi et al. ........... 359/140 |
| 5,701,374 A | * | 12/1997 | Makiuchi ....................... 385/49 |
| 5,812,708 A | * | 9/1998 | Rao .............................. 385/14 |
| 5,966,478 A | * | 12/1999 | Marcuse et al. ............... 385/14 |
| 5,999,670 A | * | 12/1999 | Yoshimura et al. ........... 385/31 |
| 6,052,498 A | * | 4/2000 | Paniccia ....................... 385/14 |
| 6,125,217 A | * | 9/2000 | Paniccia et al. .............. 385/14 |
| 6,208,791 B1 | * | 3/2001 | Bischel et al. .............. 385/129 |

* cited by examiner

Primary Examiner—Brian Healy
(74) Attorney, Agent, or Firm—Blakely, Sokoloff, Taylor & Zafman LLP (57) ABSTRACT

The invention relates to an optical clocking signal distribution article that comprises a substrate that has a front surface and a back surface that are parallel planar. A dielectric layer is disposed upon the front surface, and a recess in the substrate exposes a portion of the dielectric layer when viewed from the back surface. A first light reflecting structure is disposed in the dielectric layer. The first reflecting structure is disposed within the exposed portion of the dielectric layer. At least one light receiver is disposed upon the front surface. Also disclosed is a method of forming an optical distribution structure. The method comprises forming a recess through a substrate to expose a dielectric layer. The method further comprises forming a waveguide in the dielectric layer, wherein the waveguide has a length, a first end, and a second end, and wherein the recess is disposed over the first end of the waveguide. The method also comprises forming a first light reflecting structure at the first end of the waveguide.

24 Claims, 10 Drawing Sheets

OPTICAL CLOCKING DISTRIBUTION USING DIFFRACTIVE METAL MIRRORS AND METAL VIA WAVEGUIDES

BACKGROUND OF THE INVENTION

1. Field of the Invention

The present invention relates generally to integrated circuit clocking and, more specifically, the present invention relates to optical clocking distribution networks in integrated circuits.

2. Description of Related Art

Microelectronic devices that use an integrated circuit (IC) chip rely upon a clocking signal that is relayed throughout the chip. To make a microelectronic device more reliable, the clocking signal needs to arrive simultaneously at several sites on the device. Clock skew is the difference in arrival times of clocking signals to different parts of the chip. Synchronous digital logic requires precise clocking signal arrival for the latching data. One present standard in the industry is that clock skew budget is approximately 10% of the cycle time. Hence for a 1 GHz clock frequency, which corresponds to a 1 ns cycle time, the tolerable clock skew is less than or equal to 100 ps. As VLSI clock frequencies increase beyond 1 GHz, the necessity to reduce clock skew becomes more challenging.

Global clock distribution network clock skew is typically controlled by the use of hierarchical H-trees as are well known in the art. As integrated circuits continue to become larger, more complex, and run at higher frequencies, previous clock skew standards become unacceptable. Even with a hierarchical H-tree network, the hierarchical H-tree network clock lines do not always have uniform characteristic impedance. As a result, there may be a non-uniform propagation delay of a clocking signal traveling through the paths of the hierarchical H-tree network even though nodes may be equal distances from the clock driver.

Prior art global clocking signal distribution networks that used electrical wiring consumed a significant amount of IC chip area as well as power. For instance, the global clocking signal distribution on today's high speed IC chips typically accounts for approximately 10% of the chip power.

Some recent techniques include an optical clocking signal distribution network. In an optical clocking signal distribution network, an off chip optical source generates an optical clocking signal which is split with an optical splitter and a direct line of sight is provided to detectors through multiple openings in the back or inactive surface of the chip.

A major difficulty with the prior art optical clocking signal distribution is the difficulty in implementing it for advanced packaging technologies such as Control Collapse Chip Connection (C4) packaged chips, also referred to as flip chips. For C4 packaging, the front or active surface of the chip is hindered in its availability for optical signal access because the front surface of the chip is inverted and hidden from access. Consequently, C4 technology has lead to the development of an optical clocking signal distribution that enters the chip through the back surface.

Another important problem with an optical clocking signal distribution network is locating detectors in the direct line of sight of split optical clocking signals through the back surface of the chip. The requirement of several direct lines of sight through the back surface of the chip causes several problems. One problem is that several optical clocking signal landing zones on the back surface of the chip restricts the amount of available heat sink contact area on the back surface of the chip. With limited heat sink contact area, heat management becomes more difficult.

Another problem is that an optical clocking signal that enters the chip in the semiconductor substrate such as monocrystalline or polycrystalline silicon, must have a working wavelength that is long enough to pass through the semiconductor substrate. Relatively long wavelength optical clocking signals cause the responsivity of the signal receivers to decrease. This decrease in responsivity is due to the fact that the optical receivers are not as sensitive to the relatively long wavelength optical clocking signals as they are to relatively shorter wavelength optical clocking signals. Another problem is that optical signal receivers that obtain a signal from the back surface of the chip are more inefficient in operation than receivers that obtain a signal from the front of the chip because the optical signals must physically penetrate the substrate. Consequently, an optical clocking signal that impinges upon a receiver from the back side thereof results in a lower responsivity for reasons set forth above.

Yet another problem with back surface optical clocking signal distribution arises where many optical access recesses, and the necessary thinning, in the semiconductor substrate may weaken the chip and package as well as reduce thermal management abilities. Additionally, added profile height is necessary for the entire package because of the presence of an optical splitter.

What is needed is an optical clocking signal distribution system that overcomes the problems in the prior art.

SUMMARY OF THE INVENTION

Disclosed is an optical clocking signal distribution article that comprises a substrate that has a front surface and a back surface that are parallel planar. A dielectric layer is disposed upon the front surface, and a recess in the substrate exposes a portion of the dielectric layer when viewed through the back surface. A first light reflecting structure is disposed in the dielectric layer. The first light reflecting structure is disposed within the exposed portion of the dielectric layer. At least one light receiver is disposed upon the front surface.

Also disclosed is a method of forming an optical distribution structure. The method comprises forming a recess through a substrate to expose a dielectric layer. The method further comprises forming a waveguide in the dielectric layer, wherein the waveguide has a length, a width, a first end, and a second end, and wherein the recess is disposed over the first end of the waveguide. The method also comprises forming a first light reflecting structure at the first end of the waveguide.

BRIEF DESCRIPTION OF THE DRAWINGS

FIG. 2b is a top cut-away view of the semiconductor structure depicted in FIG. 2a.

FIG. 6b is a schematic perspective view of the diffractive step mirror depicted in FIG. 6a.

DETAILED DESCRIPTION OF THE INVENTION

A method and apparatus for optically clocking an integrated circuit in a semiconductor substrate is disclosed. In the following description, several specific details are set forth in order to provide a thorough understanding of the present invention. The present invention relates to an optical clocking distribution that uses a through-substrate trench (TST) to allow coherent light to pass entirely through a semiconductor substrate without entering the semiconductive portion thereof. The coherent light enters the semiconductor substrate from the inactive or back surface thereof. The coherent light is coupled with a diffractive mirror that is made according to the present invention. The diffractive mirror bends the coherent light into at least one direction to allow the coherent light to propagate toward a receiver. A second diffractive mirror may be used to couple the coherent light and to bend it into a direction that is orthogonal to the active surface, and into the receiver. The receiver generates a local electrical clocking signal. The present invention uses the coherent light in equal-length paths to form an optical clocking signal network, typically in hierarchical H-tree groups or simpler 1×N configurations, to improve clock speed for microelectronic devices. Although coherent or laser light is preferred, other radiant energy sources may be used, preferably monochromatic radiant energy sources such as a light-emitting diode (LED).

In the context of this disclosure, the term "semiconductor substrate" is defined to mean any construction comprising semiconductive material, including but not limited to bulk semiconductive material such as a semiconductive wafer, either alone or in assemblies comprising other materials thereon, and semiconductive material layers, either alone or in assemblies comprising other materials. The term substrate refers to any supporting structure including but not limited to the semiconductor substrates described above.

Figure 1:
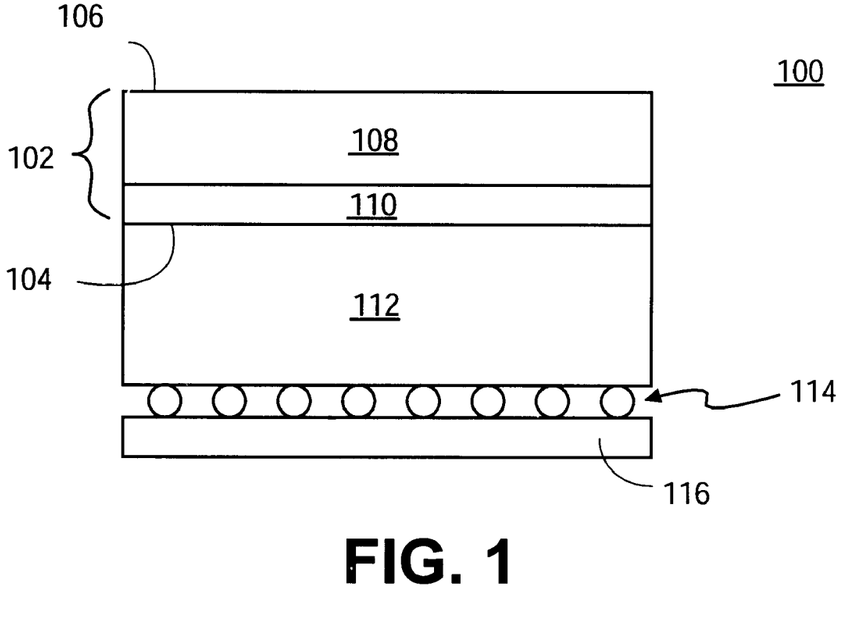
FIG. 1 is an elevational cross-section view of a semiconductor structure that has the C4 or flip chip configuration.

FIG. 1 is an elevational cross-section view of a semiconductor structure that has the C4 configuration also known as flip chip. A C4 package 100 includes a semiconductive substrate 102 with an active or front surface 104 and an inactive or back surface 106. Semiconductive substrate 102 may include bulk monocrystalline silicon 108 and a region that is doped differently from silicon 108 such as a P-epitaxial (P-epi) layer 110. A dielectric layer 112 is disposed upon front surface 104. Dielectric layer 112 may be an interlayer dielectric layer (ILD layer) made of materials that are known in the art for C4 configurations. C4 package 100 includes electrical connections that lead through dielectric layer 112 and make electrical contact with individual electrical contacts such as a ball array 114. Ball array 114 or the like is disposed upon a board 116 such as a flex board or the like or other printed wiring board types known in the art.

Figure 2A:
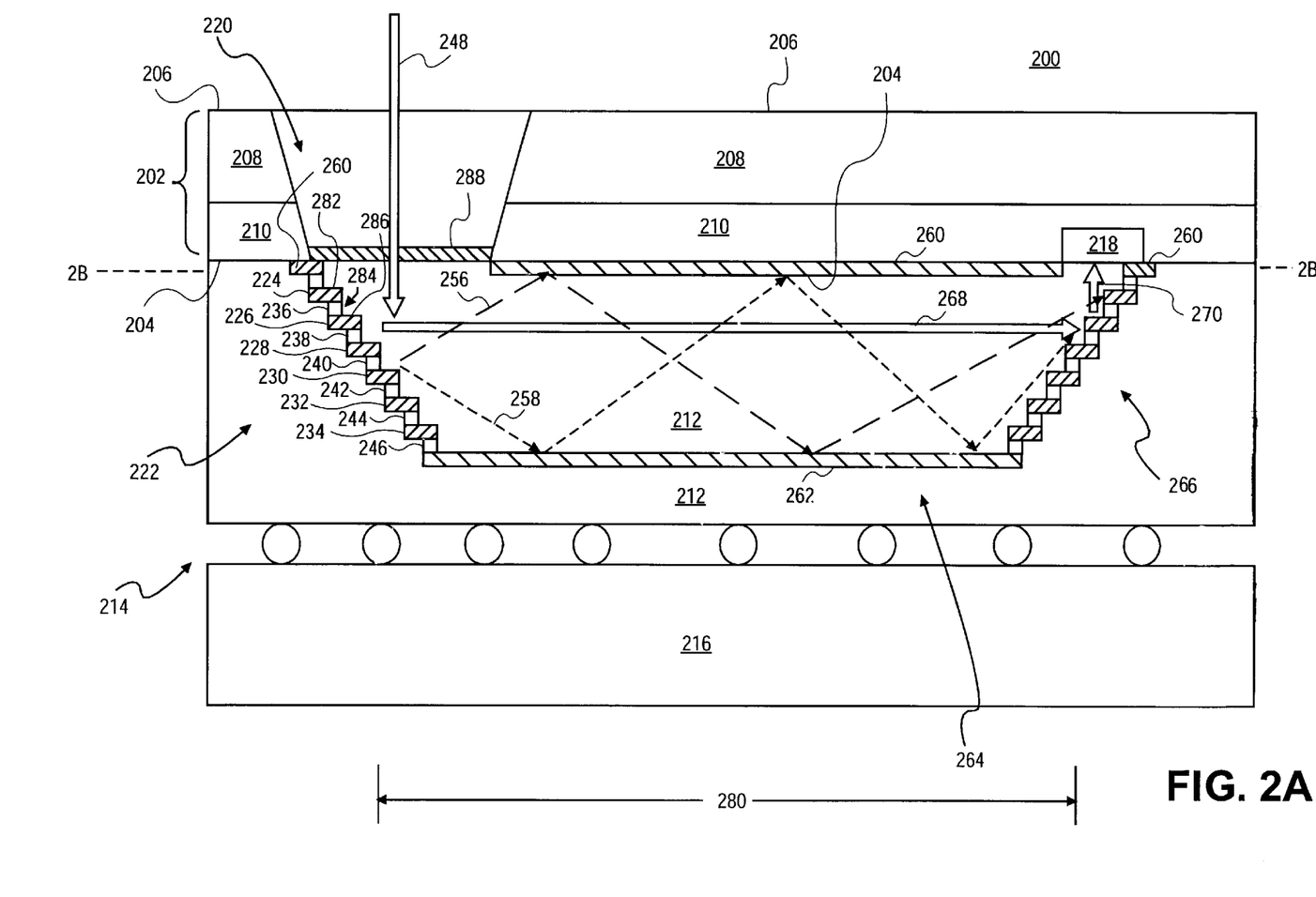
FIG. 2a is an elevational cross-section view of a semiconductor structure according to the present invention that depicts a waveguide in a dielectric layer.

FIG. 2a is an elevational cross-section view of a C4 package 200 according to the present invention. Like C4 package 100 depicted in FIG. 1, C4 package 200 includes a semiconductive substrate 202 with an active or front surface 204 and an inactive or back surface 206. Substrate 202 may include bulk monocrystalline silicon 208 and a region that is doped differently from silicon 208 such as P-epi layer 210. A dielectric layer 212 is disposed upon front surface 204. Dielectric layer 212 may be an ILD layer made of materials that are known in the art for C4 configurations or other configurations. C4 package 200 includes electrical connections that lead through dielectric layer 212 and make electrical contact with individual electrical contacts such as a ball array 214 or the like. Ball array 214 is disposed upon a board 216 such as a flex board or the like or other printed wiring board types known in the art.

Disposed within P-epi layer 210 is a light receiver 218 that may be an N-doped region in this instance. Other receivers may be used according to the structural and doping configuration of a given substrate.

Disposed in semiconductive substrate 202 is a recess that forms a through-substrate trench (TST) 220. TST 220 is a hole or foramen that passes entirely through semiconductive substrate 202 and that stops on dielectric layer 212 substantially at the level of front surface 204. Within dielectric layer 212 is a composite of metallizations and other materials. The metallizations may include metal-1 (M1) 224, M2 226, M3 228, M4 230, M5 232, M6 234 and other light-reflecting structures including metallizations and metal silicides.

M1 224 through M6 234 are each reflecting bodies. As a composite, the reflecting bodies make up at least some of a first light reflecting structure 222. First light reflecting structure 222 is exposed within the area or footprint that is projected by TST 220 onto dielectric layer 212. Because first light reflecting structure 222 receives incident light 248 from outside C4 package 200, it may be referred to as an incident light reflecting structure 222. Incident light reflecting structure 222 is disposed within dielectric layer 212 such that it is covered therewith. Incident light reflecting structure 222, where it is made with metals and uses the optical diffraction effect, may be referred to as a diffractive metal mirror (DMM). In one embodiment, the incident light reflecting structure 222 is a series of metallizations that is disposed at an angle that is oblique to the plane of front surface 204.

As a composite light-reflecting structure, C4 package 200 includes metallizations 224–234 that appear effectively as "treads" in a staircase-like configuration. Interspersed between metallizations 224–234 is a series of metal structures that are also light reflecting. These metal structures which are made during metal via fabrication may be referred to as vias 236–246. Vias 236–246 appear as "risers" in the staircase-like configuration of incident light reflecting structure 222. Vias 236–246 may also be referred to as reflecting bodies. Depending upon the process parameters for the metallizations 224–234, such as thickness and spacing between each metal layer, the diffractive step mirror can be designed to bend the incident light to propagate parallel to semiconductor substrate 202 or from front surface 204.

The present invention may be referred to as a first optical reflector in an electrical device. The device includes a substrate 202, wherein the substrate comprises a front surface 204 and a back surface 206 that are parallel planar, and wherein the substrate further comprises a through hole 220. A dielectric layer 212 is disposed upon the front surface 204 and over the through hole 220. A first reflecting body 224 is disposed over the front surface 204 and has a first reflecting surface 282 that is coplanar with the front surface 204. A second reflecting body 236 is disposed adjacent the first reflecting body 224 and has a second reflecting surface 284 that is perpendicular to first reflecting surface 282. In the inventive structure, a third reflecting body 226 is disposed adjacent the second reflecting body 236 and has a third reflecting surface 286 that is parallel to first reflecting surface 282. Thus, a series of light reflecting bodies is presented that are alternatingly parallel and perpendicular to front surface 204.

Additionally, an antireflective coating 288 may be provided at the base of TST 220 upon dielectric layer 212 at the level of front surface 204 of substrate 202. The thickness of antireflective coating 288 may be determined by wavelength of incident light 248. Typically, a quarter-wavelength thickness is used for antireflective coating 288 that may be either monolithic or composite.

The light reflection may be enhanced by a second optical reflector such as secondary light reflecting structure 266. The second optical reflector is disposed within the dielectric layer and is aligned with the first optical reflector. The second optical reflector comprises fourth, Fifth, and sixth reflecting bodies. The fourth and sixth reflecting bodies are portions of metallization lines in the integrated circuit device wiring configuration that correspond to the first and third reflecting bodies, respectively. The fifth reflecting body is a metal via material that corresponds to the second reflecting body. Where the first and second optical reflectors have more than two metallizations, additional reflecting bodies may be included as illustrated for secondary light reflecting structure 266.

Referring again to FIG. 2a, reflected waves 256 and 258 are seen propagating between a first elongate reflecting barrier 260 and a second elongate reflecting barrier 262. First elongate reflecting barrier 260 and a second elongate reflecting barrier 262 combine to vertically confine reflected waves such as reflected waves 256 and 258. Consequently, dielectric material of dielectric layer 212 that is confined between first elongate reflecting barrier 260 and a second elongate reflecting barrier 262 is an effective waveguide 264 for optical clocking signals such as reflected waves 256 and 258.

It is noted that waveguide 264 has a length 280, a first end at or near incident light reflecting structure 222, and a second end at or near secondary light reflecting structure 266, unless secondary light reflecting structure 266 is not present. Where secondary light reflecting structure 266 is not present, the second end is at or near light receiver 218.

Although the presence of secondary light reflecting structure 266 is preferred, C4 package 200 according to the present invention may be fabricated without secondary light reflecting structure 266, and secondary light 268 may impinge upon receiver 218 by favorable impinging of optical clocking signals such as reflected light 256 and 258.

Figure 3A:
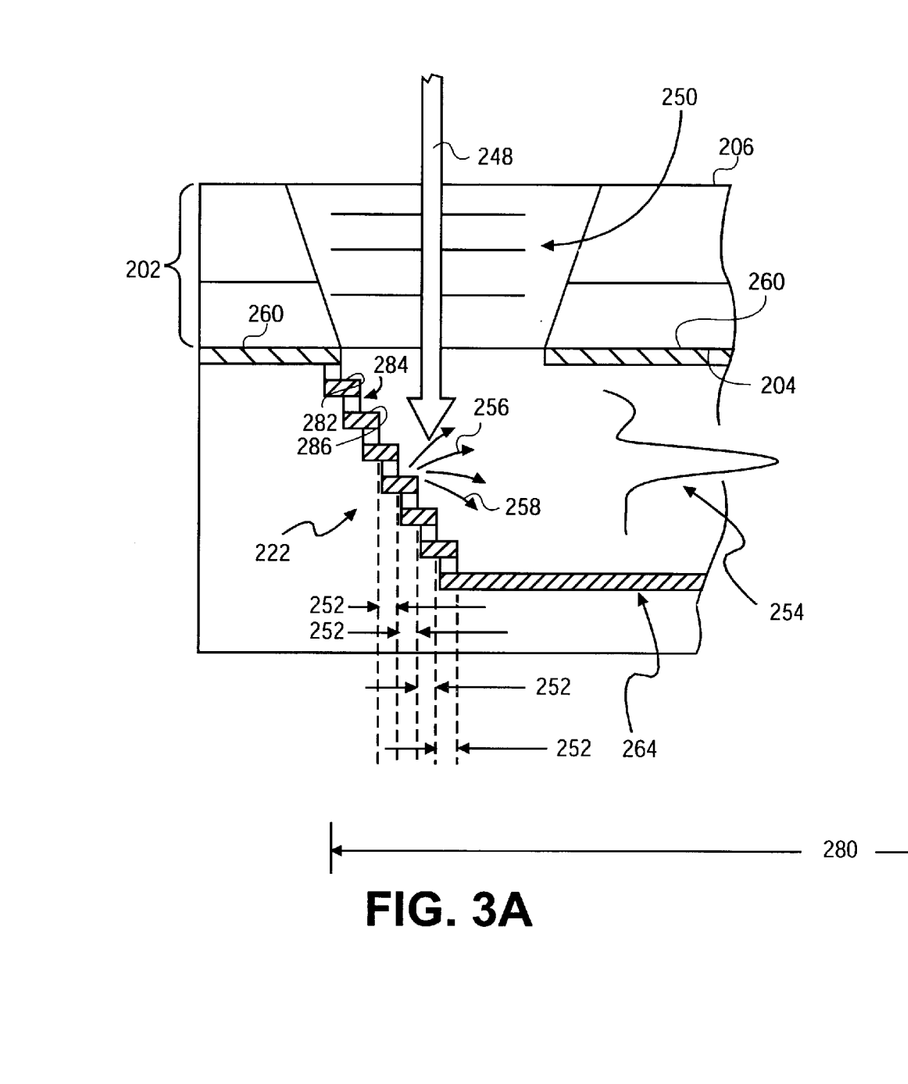
FIG. 3a is simplified view of the semiconductor structure depicted in FIG. 2a at the recess end of the waveguide.

FIG. 3 is a simplified view of FIG. 2a that further illustrates the present invention. FIG. 3 illustrates the diffractive and reflective effects caused by incident light reflecting structure 222 as light couples therewith. In FIG. 3a, incident light 248 approaches incident light reflecting structure 222 with an incident plane 250 that is parallel with back surface 206 of semiconductive substrate 202. As incident light 248 impinges upon incident light reflecting structure 222, the "tread" lengths 252 of metallizations 226–236 in relation to the wavelength of incident light 248 cause incident light 248 to be diffracted. Consequently, an interference pattern 254 is created that propagates within dielectric layer 212 in a direction that may be orthogonal to the direction of incident light 248. Interference pattern 254 is formed by a composite of reflected waves.

Figure 3B:
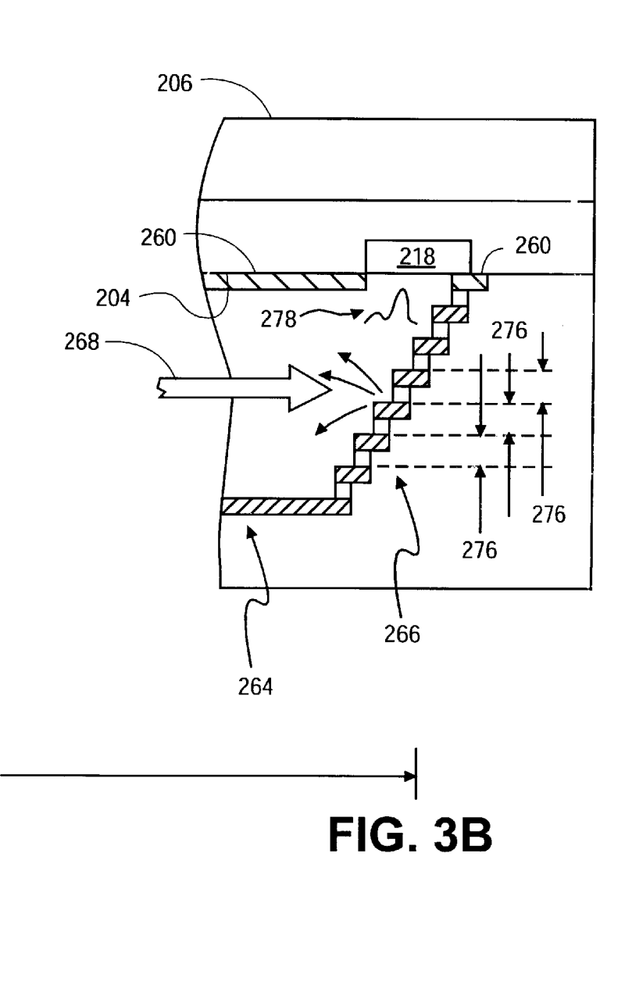
FIG. 3b is a simplified view of the semiconductor structure depicted in FIG. 2a at the light receiver end of the waveguide.

FIG. 3 also illustrates a secondary light reflecting structure 266 at FIG. 3b. Disposed at the terminal end of waveguide 264 is secondary light reflecting structure 266 that has essentially the same structure as incident light reflecting structure 222 but with a stair-step slope that is a mirror image thereto. Where incident light 248 may be referred to as primary light 248, the composite of reflected light 256 and 258 may be referred to as secondary light 268 with interference pattern 254 as illustrated in FIG. 3a. After secondary light 268 couples with secondary light reflecting structure 266, a beam of tertiary light 270 is formed that impinges upon receiver 218.

As set forth above regarding FIG. 3a, the lengths 252 of the tread part of metallizations M1–M6, 224–234 respectively, or a superset or subset thereof where greater or fewer metallizations are used to form steps, is correlated to the appropriate wavelength in order to achieve useful diffraction of incident light 248. Similarly, the riser height 276 depicted in FIG. 3b is correlated to achieve useful diffraction of secondary light 268 upon secondary light reflecting structure 266. The selection of both lengths 252 of the tread part of metallizations illustrated in FIG. 3a and heights 276 of the riser part thereof illustrated in FIG. 3b, may be done according to methods that are known in the diffraction art and as may depend upon a specific application.

In a manner similar to the formation of interference pattern 254, a tertiary light interference pattern 278 may form as part of tertiary light 270 as illustrated in FIG. 3b. Secondary light reflecting structure 266, where it is made with metals, may be referred to as a DMM.

Figure 2B:
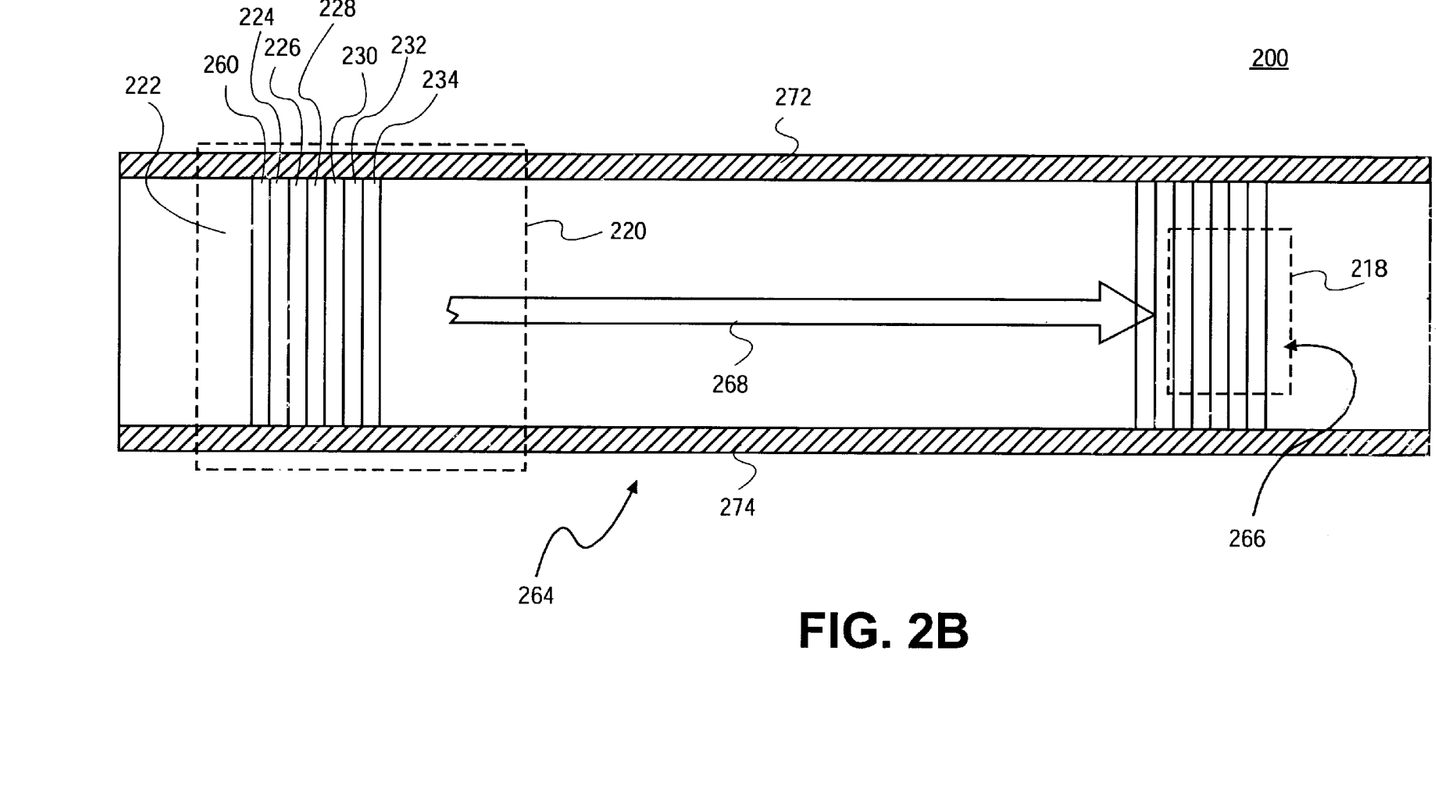

FIG. 2b is a top cut-away view of C4 package 200 taken along the line 2b—2b as depicted in FIG. 2a, where it is presumed that dielectric layer 212 is transparent to the viewer. FIG. 2b illustrates that waveguide 264 preferably also has elongate lateral reflecting barriers 272 and 274, which can be formed by for example, the vias used to connect metallization layers, conventionally used for electric signal connections in ICs. As such, waveguide 264 may entirely confine secondary light 268 and tertiary light 270 therewithin. Secondary light 268 and tertiary light 270 are confined by the combination of first elongate reflecting barrier 260 and second elongate reflective barrier 262 for vertical confinement, and by elongate lateral reflecting barriers 272 and 274 for lateral confinement. Alternatively, any or all elongate reflecting barriers may simply be dielectric material that is doped differently than bulk dielectric material such as dielectric material 212 depicted in FIG. 2. Where elongate reflecting barriers are doped dielectric material or where a reflecting structure has about three metallizations, it is preferred that waveguide 264 may have a non-square cross-sectional shape such as a ribbon cross-sectional shape. The aspect ratio of the ribbon cross-sectional shape may be in the range from about 1.1:1 to about 10:1, preferably from about 2:1 to about 8:1. Otherwise, the aspect ratio may be about 1:1.

The projected areas of TST 220 and light receiver 218 are illustrated in phantom lines in FIG. 2*b*. The projected areas of TST 220 and light receiver 218 are illustrated in phantom lines to demonstrate that TST 220 exposes the first end of waveguide 264 at incident light reflecting structure 222, and that light receiver 218 and secondary light reflecting structure 266 are located at the second end of waveguide 264.

The formation of all structures such as M1 through M6, 224 through 234, respectively, may be entirely incidental to the metallization process. Additionally, the formation of all elongate reflecting barriers 260, 262, 272, and 274 may be accomplished piecemeal like unto the formation of the light reflecting structures. Optionally, the formation of all elongate reflecting barriers 260, 262, 272, and 274 may be accomplished with a process such as a single deposition, such as is preferred for first and second elongate reflecting barriers 260 and 262.

The present invention relates to materials that are preferred in the inventive C4 package. Metallizations such as M1–M6, and others may be made from any suitable electrically conductive material. Preferably, metallizations are made from metals such as aluminum or copper and their alloys. Metallizations may be made from other metals that are suitable for metallization. Metallizations may be made from electrically conductive polycrystalline silicon and other non-metallic conductors.

Silicides such as first elongate reflecting barrier 260, present in the inventive articles and devices, are preferably made from metal silicides. More preferably, silicides are made from reflecting metal silicides and even more preferably from reflecting metal silicides where the metal is selected from the group consisting of Co, Ni, Ti, W, Hf, Zr, Sc, Ta and combinations thereof. Most preferably, silicides are made from the group consisting of cobalt silicide, titanium silicide, and tungsten silicide in both stoichiometric ratios and solid solution ratios as may be preferred by the specific application.

Dielectric layer 212 may be made from any material that allows coherent light to pass therethough, in the wavelength range below about 2,000 nm. Preferably dielectric layer 212 allows the wavelength range to be from about 500 nm to about 2,000 nm, more preferably from about 600 nm to about 1,000 nm, even more preferably from about 700 nm to about 900 nm, and most preferably about 800 nm. A particular preferred wavelength range, however, may depend upon or be determined by the peak response wavelength of the receivers 218.

One preferred dielectric material is oxide of silicon such as $SiO_2$. Other preferred oxides of silicon include borophosphosilicate glass (BPSG), ion-implant doped oxides of silicon, tetraethylorthosilicate (TEOS) deposition, and other doped oxides of silicon.

In a first example, a particularly preferred embodiment of the present invention relates to an 800 nm wavelength coherent light that was used as incident light 248. Incident light 248 was applied in an inventive optical distribution article to achieve an optical path system. The optical path system experienced about 100% quantum efficiency of a silicon light receiver 218. A comparative example was accomplished by the use of coherent light at a wavelength of about 1,064 nm wherein the quantum efficiency was about 0.0001 or about only 0.01%. Light at a wavelength of about 1,064 nm is the coherent light that was previously necessary to accomplish penetration through semiconductive substrate 100 for back-surface entering, back-side receiver impinging light.

The present invention also relates to an optical path system in a microchip package such as C4 package 200. A first optical path section may be referred to as similar to or identical with the illustrated length of incident light 248, which can come from free space or be delivered by an optical fiber. The first optical path section 248 is disposed between a light source and a reflecting structure such as first reflecting structure 222. Where the light source is remote from the microchip package, the first optical path section extends through a gas such as air or an entrapped process gas such as nitrogen or argon, into a recess such as TST 220, and through dielectric layer 212, which surface is antireflection coated to reduce reflection loss. Typically, quarter-wavelength antireflection coatings are use that may be monolithic or composite. In other words, the first optical path section extends from the light source through back surface 206 and terminates at incident light reflecting structure 222.

A second optical path section is disposed between first reflecting structure 222 and second reflecting structure 266. The second optical path section extends parallel to front surface 204, and through a portion of dielectric layer 212. The second optical path section may be identified as the illustrated length of secondary light 268.

A third optical path section is disposed between second reflecting structure 266 and light receiver 218. The third optical path section extends orthogonal to front surface, through a portion of dielectric layer 212. The third optical path section may be identified as the illustrated length of tertiary light 270.

Figure 4:
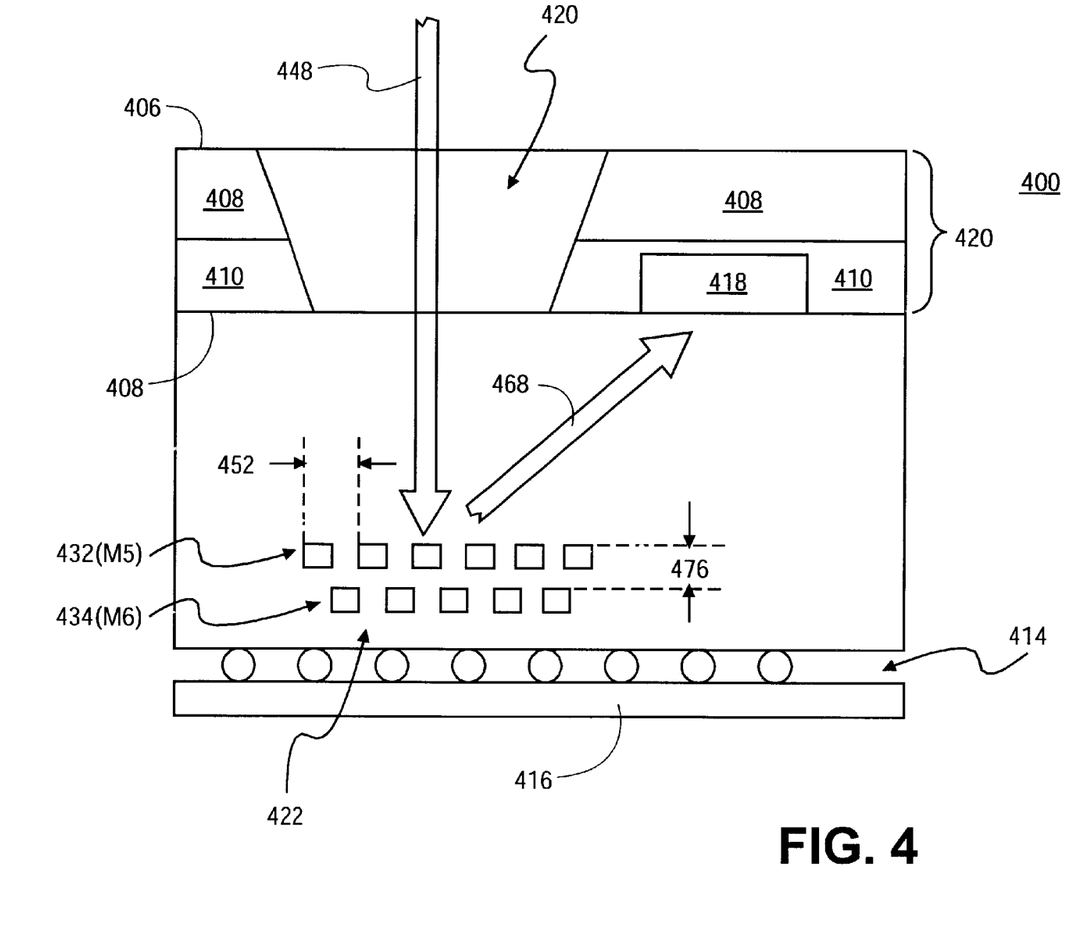
FIG. 4 is an elevational cross section view of a semiconductor structure according to one embodiment of the present invention.

FIG. 4 illustrates another embodiment of the present invention that includes a C4 package 400. C4 package 400 includes a diffractive mirror 422 that is made from at least one metallization layer such as either one or both of the two layers M5 432 and M6 434 in FIG. 4. Diffractive mirror 422 may also be made of nonmetals as set forth above. Diffractive mirror 422 acts as an incident light reflecting structure 422 that may accomplish diffractive coupling of incident light 448 similar to incident light reflecting structure 222 depicted in FIG. 2. Similar to the effect of tread lengths 252 and riser heights 276 seen in FIG. 3, the intralevel pitch 452 and the interlevel height 476 in relation to the wavelength of the incident light 448 will affect the quality and quantity of diffraction of incident light 448. Diffractive mirror 422, where it includes metals, may also be referred to as a DMM.

Although not specifically illustrated, elongate reflective structures may be provided in this embodiment to confine the light energy into a waveguide as discussed above. Additionally, secondary light reflecting structures such as secondary light reflecting structure 266 depicted in FIG. 2 may be placed below the optical clocking light receiver 418 to cause coupling of secondary light 468 into receiver 418 by diffractive reflection. Finally, a secondary light reflecting structure such as diffractive mirror 422 may be configured below receiver 418 to couple secondary light 468 into tertiary light.

Figure 5:
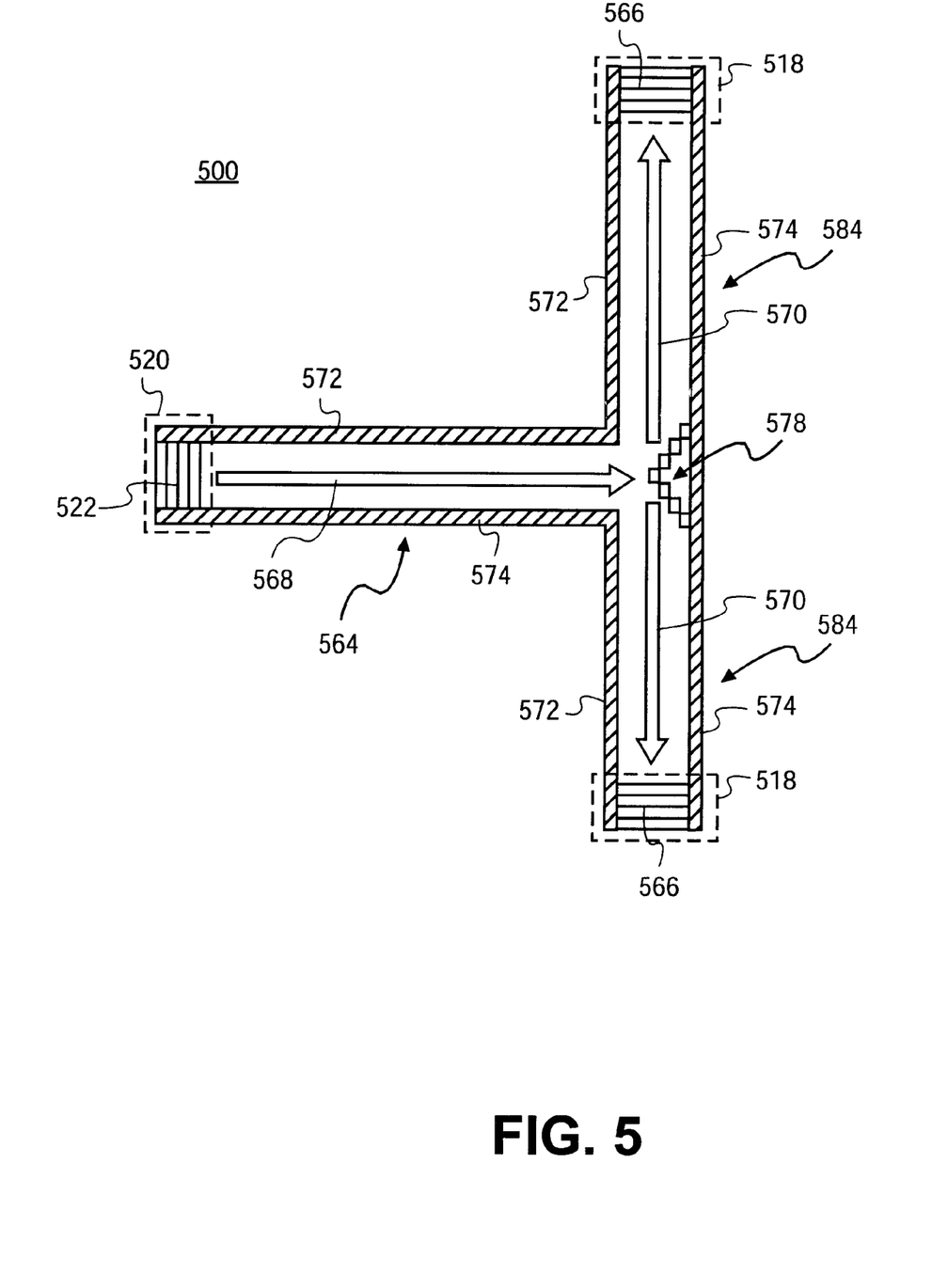
FIG. 5 is a plan view of one embodiment of the invention wherein a diffractive step mirror divides an optical clocking signal into two optical clocking signals.

The present invention also includes dividing and distributing the single radiant energy emission such as coherent light into a plurality of substantially equal-length radiant energy paths to an equal plurality of receivers. FIG. 5 is an illustration of one embodiment of the present invention for distributing the single radiant energy emission into at least one hierarchical H-tree or the like. In FIG. 5, a C4 package 500 is illustrated in cut-away plan view similar to C4 package 200 depicted in FIG. 2*b*. Incident light (not illustrated) impinges upon an incident light reflecting structure 522 from a direction that may be substantially orthogonal to the plane of FIG. 5. As incident light strikes incident light reflecting structure 522, secondary light 568 is generated that propagates in the direction toward a step mirror 578. Step mirror 578 may be made of any light reflecting materials according to the preferred use and according to the specific application as set forth herein. Step mirror 578, where it includes metals, may also be referred to as a DMM. Any other diffractive mirror may also be used as disclosed.

For structural considerations regarding C4 package 500, secondary light 568 as illustrated may be considered to be a symmetry line that bisects waveguide 564. Secondary light 568 couples with step mirror 578 and is divided into two tertiary light 570 beams that propagate at right angles to secondary light 568 toward tertiary light reflecting structures 566. In a similar manner, tertiary light 570 as illustrated may be considered to be a symmetry line that bisects waveguides 584.

Depicted in phantom lines are a footprint projection of TST 520, and two footprint projections of light receivers 518. Thus, FIG. 5 illustrates the placement of reflecting structures below either a TST or below a light receiver for a 1×2 configuration. For illustrative clarity, the illustrated size of the footprint projections may be larger than actual footprint projections.

Optional elongate lateral reflecting barriers 572 and 574 are also depicted in FIG. 5. As set forth above, elongate lateral reflecting barriers 572 and 574 may be made of metal vias or metal silicide materials. They may be made of metals. They may also be made of a differently doped region of dielectric layer 212 that has an index of refraction that is sufficient to cause a useful portion of light to be retained therewithin. Similarly, step metal mirror 578 may be made of a metal silicide material or a differently doped region of dielectric layer 212 that has an index of refraction that is sufficient to diffract secondary light 568.

Figure 6A:
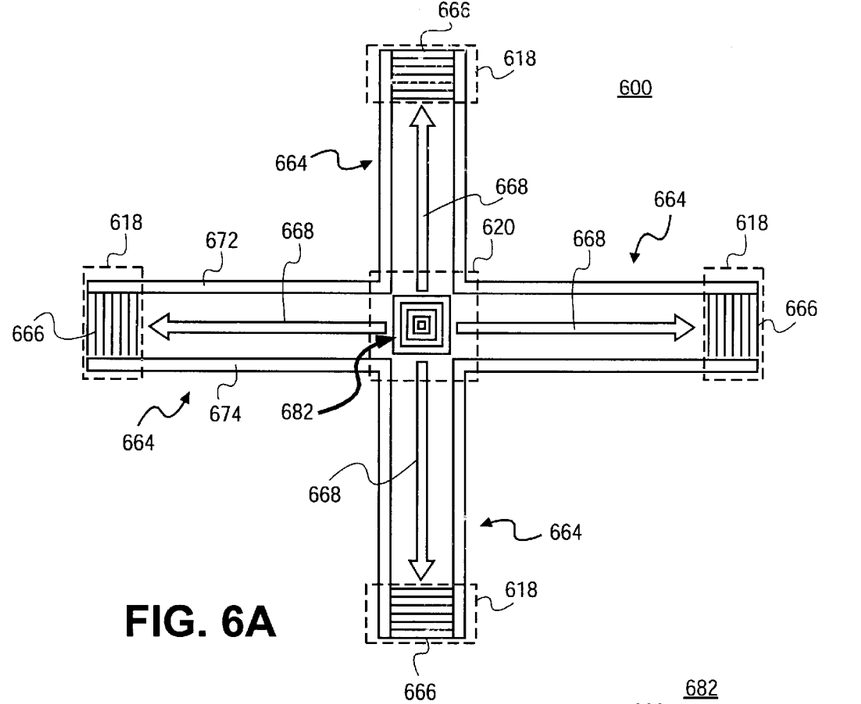
FIG. 6a is a plan view of one embodiment of the invention wherein a diffractive step mirror in a pyramid configuration divides an optical clocking signal into four optical clocking signals.

FIG. 6a is a plan view of another embodiment of the present invention wherein a 1×4 C4 package 600 is illustrated in cut-away plan view similar to that depicted in FIG. 5. Operation of C4 package 600 is carried out by sending an optical signal in a direction that is substantially orthogonal to the plane of the Figure, toward a pyramid reflector 682 that is located at the crux of C4 package 600. In a manner similar to the coupling of light at incident light reflecting structure 522 depicted in FIG. 5, incident light is coupled with pyramid reflector 682 and is quartered and redirected as secondary light 668 toward respective secondary light reflecting structures 666. Pyramid reflector 682, where it includes metals, may be referred to as a DMM.

FIG. 6a also illustrates in phantom lines, a footprint projection of a TST 620 and four footprint projections of light receivers 618. In a manner similar to the illustration in FIG. 5, FIG. 6 illustrates that the placement of reflecting structures may be below either a TST or below a light receiver.

Figure 6B:
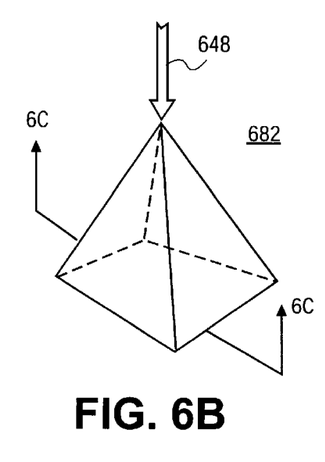
Figure 6C:
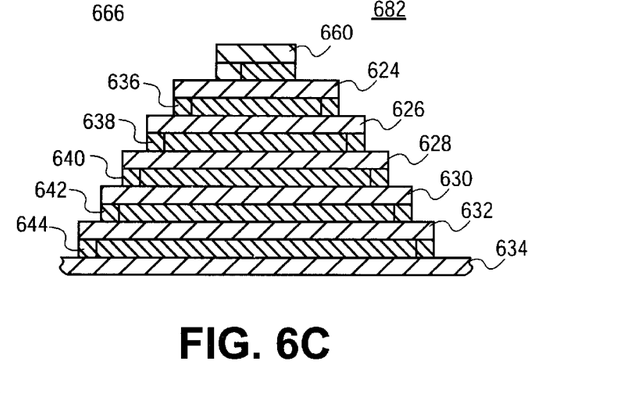
FIG. 6c is an elevational cross section view of the refractive step mirror, taken along the section line 6c—6c from FIG. 6b.

FIG. 6b is a schematic perspective view of pyramid reflector 682 that illustrates the general shape thereof. FIG. 6c is an elevational cross section view of pyramid reflector 682 as taken along the section line 6c—6c from FIG. 6b. In FIG. 6c, the construction of pyramid reflector 682 is illustrated as being a pyramid shaped structure, wherein the pyramid shaped structure comprises a plurality of alternatingly adjacent metal line and via materials, wherein the alternatingly adjacent metal line and via materials have a series of graduated characteristic dimensions. In other words, M1 624 through M6 634 may be constructed with alternatingly adjacent vias such as vias 636 through 644, respectively. The characteristic dimension of M5 632 is larger than the characteristic dimension of M4 630, which in turn is larger than the characteristic dimension of M3 628, and so forth.

C4 package 600 is therefore considered to be a microelectronic device wherein the pyramid shaped structure comprises a series of metallizations including at least M1 through M3. In this embodiment as in all embodiments, both tread dimension and step height are chosen according to the specific application.

Figure 7:
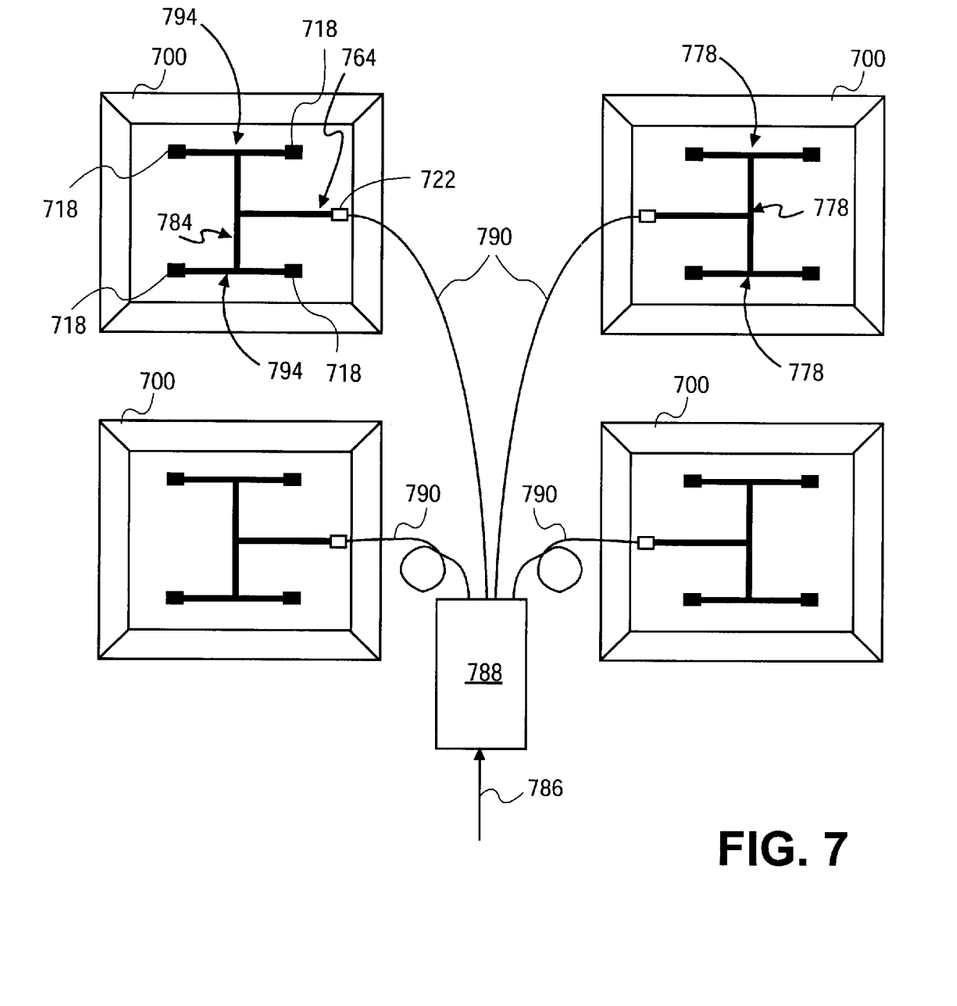
FIG. 7 is a plan view of one embodiment of the present invention wherein a single light source is distributed to a plurality of semiconductor structures that in turn divides the light signal into a plurality of optical clocking signals according to the present invention.

FIG. 7 is a plan view of an optical clocking signal distribution apparatus embodiment of the present invention. In the optical clocking signal distribution apparatus, a single light signal 786 is directed to a distributor 788. Single light signal 786 is distributed through a plurality of fiber optics 790 with equal lengths to a plurality of semiconductor structures such as each of C4 packages 700. In turn, each of C4 packages 700 divide the optical clocking signal into a plurality of optical clocking signals according to the present invention. In FIG. 7, each C4 package 700 includes an incident light reflecting structure 722, a secondary light waveguide 764, a tertiary light waveguide 784, and quaternary light waveguides 794. Accordingly, the hierarchical H-tree configuration is used to distribute the optical clocking signal according to the present invention. The optical clocking signal distribution apparatus may be part of a microelectronic system such as a digital computer or the like, a hand-held device or the like, or a wireless semiconductor device such as a personal data assistant (PDA) or a cellular telephone, or a combination thereof. The optical clocking signal distribution apparatus may be part of a programmable logic array (PLA) or a programmable logic device (PLD).

Figure 8:
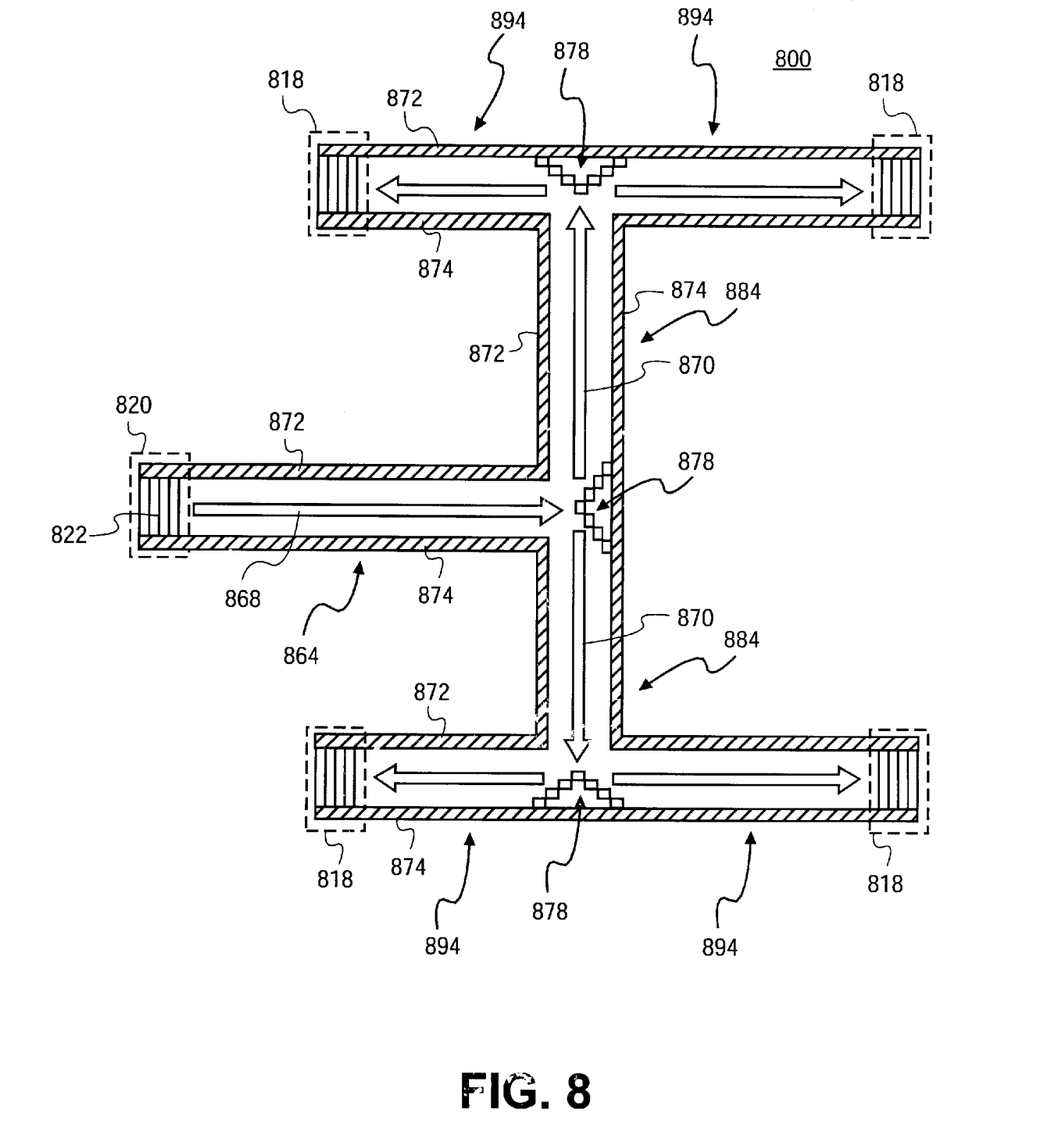
FIG. 8 is a detail cut-away plan view of an optical clocking signal distribution apparatus embodiment of the present invention

FIG. 8 is a detail cut-away plan view of an optical clocking signal distribution apparatus embodiment of the present invention for a C4 package 800, with an hierarchical H-tree layout as seen in FIG. 7. In the optical clocking signal distribution apparatus, a single light signal (not shown) is directed through a TST 820, depicted in phantom lines, to couple with an incident light reflecting structure 822. A secondary light waveguide 864, couples secondary light 868 with a step mirror 878 that forms tertiary light 870. Tertiary light waveguides 884 conduct tertiary light 870 away from step mirror 878 and couple it with other step mirrors 878 located within waveguides 894. Finally, quaternary light 896 couples with terminal light reflecting structures 886 and terminal light (not shown) couples with receivers 818. Accordingly, the hierarchical H-tree configuration is used to distribute the optical clocking signal according to the present invention.

Figure 9:
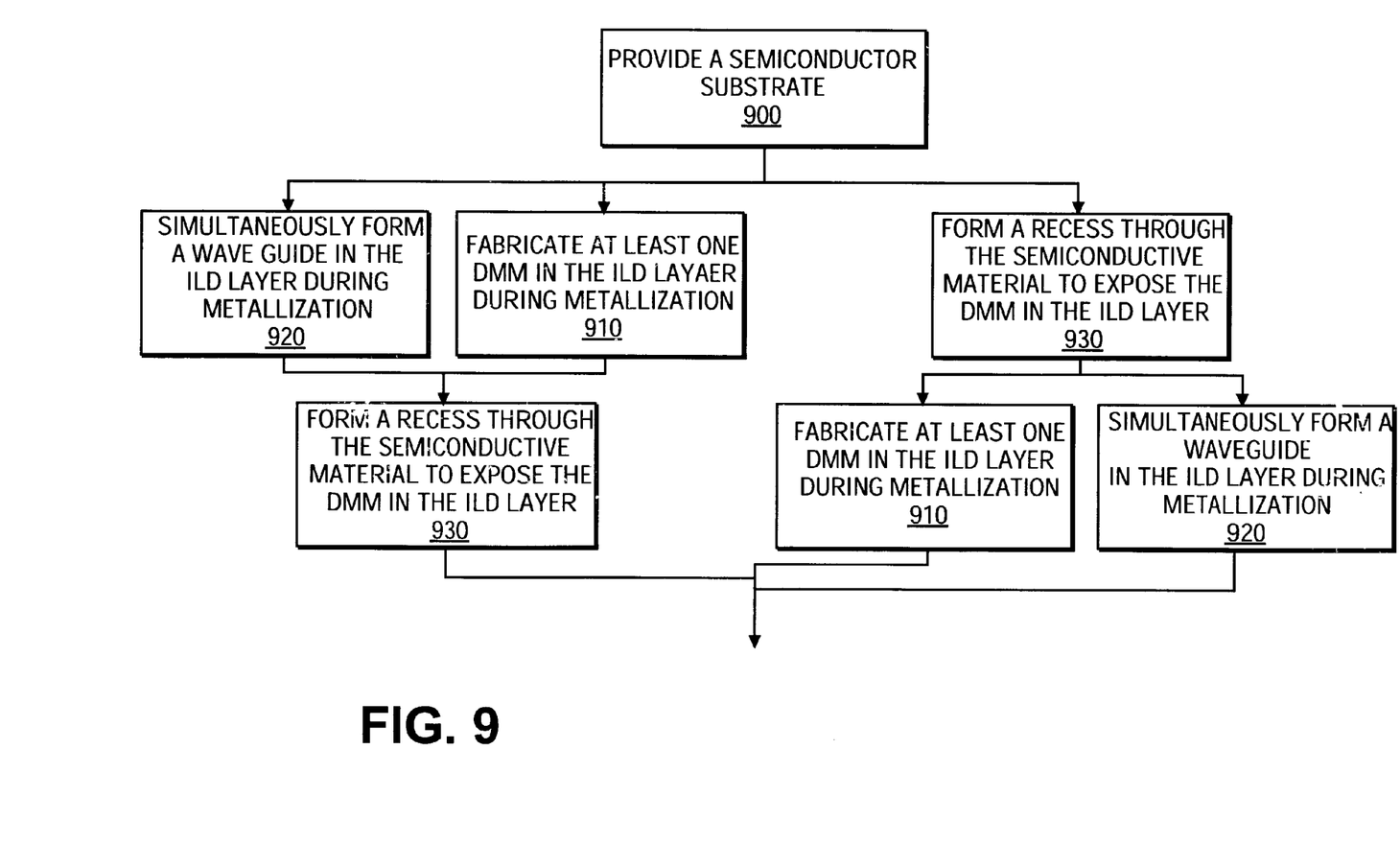
FIG. 9 is a flow chart that describes an inventive method according to the present invention.

The present invention also relates to a method of forming an optical distribution structure such as the optical distribution structures embodied in C4 packages and as described herein in alternative embodiments. FIG. 9 is a process flow diagram that illustrates the inventive method. Block 900 illustrates the provision of a semiconductor substrate. At least two alternative process paths are possible in the present invention.

A first preferred process path continues from block 900 to block 910 along a path down the left side of FIG. 9. This process path accomplishes the initial fabrication of at least one reflecting structure such as incident light reflecting structure 222 depicted in FIG. 2. Block 920 illustrates the alternative of forming a waveguide in the ILD layer during the metallization process. As an alternative embodiment of this process, formation of the waveguide may be simultaneous thereto or subsequent thereto. Such a waveguide may be formed in the 1L,D layer such as waveguide 264 depicted in FIG. 2. The present invention is further carried out by forming a first reflecting structure such as incident light reflecting structure 222 at the first end of waveguide 264. As set forth above, two light reflecting barriers may be formed such as first elongate reflecting barrier 260 and second elongate reflecting barrier 262. The inventive method may also include forming lateral elongate reflecting barriers such as first elongate reflecting barrier 260, made preferably of a suicide such as cobalt silicide, and second elongate reflecting barrier 262 made of metallization material as set forth above, and preferably made of material such a M7, M6, or lower, as depicted in FIG. 2b. As such, the inventive method forms a light-confining waveguide 264 that allows a radiant energy signal to propagate through back surface 206, entirely though a hole or TST 220, into waveguide 264, and ultimately into receiver 218 at the second end thereof.

In this method embodiment, block 930 flows from block 910 or block 920 and illustrates the formation of a recess such as TST 220 through a substrate to expose a dielectric layer such as dielectric layer 212. According to the present invention, the recess or TST 220 is disposed over the first end of waveguide 264 and has a sufficiently large characteristic dimension such as a radial diameter of rectangular width, etc., to accomplish exposure of a structure such as incident light reflecting structure 222 to incident light 248.

Another preferred embodiment of the invention is also depicted in FIG. 9 and is ascertained by following the flow path down the right side of FIG. 9. In this embodiment, formation of a recess is illustrated in block 930, is carried out before the completion of an ILD layer. Next, process flow proceeds from block 930 to block 910 where the reflecting structure such as a DMM is carried out incidental with metallization. The alternative formation of a waveguide is next illustrated by block 920. Blocks 910 and 920 are displayed abreast each other to indicate the likely simultaneous carrying out of each process.

It is understood from the foregoing disclosure that process variations including processing order may depend upon the specific application or upon specific packaging and testing procedures. In one instance, the formation of a recess is preferred to be last among process alternatives depicted in FIG. 9. In another instance, the formation of a recess may be preferably first.

The present invention also relates to a method of distributing an optical clocking signal and may be illustrated by reviewing at least one of FIGS. 2a–8. According to the present invention, the inventive method comprises providing an electrical device such as a C4 package. Next, a signal of radiant energy, preferably coherent light of a preferred wavelength as set forth above, is transmitted into the electrical device through a recess in the back surface and into the dielectric layer as set forth above. The signal is redirectioned with a reflecting structure disposed within the dielectric layer such as incident light reflecting structure 222 disposed within dielectric layer 212.

Distinct advantages exist in the present invention. Because of the single-access of an optical clocking signal through the back surface of a semiconductor substrate, the single-footprint TST allows for more thermal conductive contact with the back surface. Consequently, the chip package as an integrated heat sink is improved. A less preferred, but inventive embodiment allows for multiple TSTs in a single C4 package.

Another advantage of the present invention is the use of radiant energy, such as coherent light, with a wavelength that is shorter than that used in previous backside optical clocking devices. In combination with the ever-shrinking integrated circuit chip size, the shorter wavelength light allows for better receiver responsivity compared to the use of longer wavelength light that was needed in the prior art.

Another advantage of the present invention is that the clock skew budget is less than about 10% of the cycle time, preferably, less than about 6%, more preferably less than about 2%, and most preferably less than about 1%. Similarly, the global clocking signal distribution accounts for less than about 10% of the chip power, preferably less than about 6%, more preferably less than about 2%, and most preferably less than about 1%.

Another advantage of the present invention is the inventive method of forming an optical distribution structure because it may be carried out entirely incidental to any fabrication technology without additional processing needs. For example, the construction of a light reflecting structure such as incident light reflecting structure 222, secondary light reflecting structure 266, or pyramid reflector 682, may be carried out piecemeal during conventional metallization such as M1 through M6 or higher. At the end of the metallization process, the presence of the inventive optical clocking distribution article that includes the light reflecting structures, the step mirrors, the elongate reflecting barriers, and the pyramid reflectors among others, may be completely incidental to the metallization process.

The inventive optical clocking signal distribution network provides reduced clock skew for high speed, high power integrated circuits packaged into C4 and C4/MCM packaging and is fully compatible with the back surface heat sink attachment for these packages. The inventive optical clocking signal distribution network also reduces power dissipation due to global clock distribution by eliminating the large capacitative load of the global network that is inherent in an signal directed over electrically conductive wiring.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. An optical clocking signal distribution article comprising:
   a substrate comprising a front surface and a back surface that are parallel planar, a dielectric layer disposed upon the front surface, and a recess in the substrate that forms an exposed portion of the dielectric layer through the back surface;
   a first light reflecting structure disposed in the dielectric layer and disposed within the exposed portion of the dielectric layer; and
   at least one light receiver disposed upon the front surface.

2. The optical clocking signal distribution article according to claim 1, wherein the light reflecting structure comprises a series of metallizations that are disposed at an angle that is oblique to the plane of the front surface.

3. The optical clocking signal distribution article according to claim 1, further comprising:
   a second light reflecting structure disposed between the first light reflecting structure and the receiver.

4. The optical clocking signal distribution article according to claim 1, wherein the first light reflecting structure is disposed within a waveguide.

5. The optical clocking signal distribution article according to claim 1, further comprising:
a second light reflecting structure disposed in the dielectric layer, wherein the first and second light reflecting structures are disposed within a waveguide.

6. The optical clocking signal distribution article according to claim 1, further comprising:
a second light reflecting structure disposed in the dielectric layer, wherein the first and second light reflecting structures are a portion of a hierarchical H-tree optical clocking distribution network.

7. The optical clocking signal distribution article according to claim 1, wherein the optical clocking distribution article further comprises a microelectronic device selected from the group consisting of a digital computer, a hand-held device, and a wire less semiconductor device.

8. The optical clocking signal distribution article according to claim 1, further comprising:
an antireflective coating disposed in the recess and upon the dielectric layer.

9. A method of forming an optical distribution structure comprising:
providing a substrate, wherein the substrate comprises a front surface and a back surface that are parallel planar, and a dielectric layer disposed upon the front surface;
forming a recess through the substrate to expose a dielectric layer;
forming a waveguide in the dielectric layer, wherein the waveguide has a length, a first end, and a second end, and wherein the recess is disposed over the first end of the waveguide; and
forming a first reflecting structure at the first end of the waveguide.

10. The method of claim 9, further comprising:
forming a second reflecting structure at the second end of the waveguide.

11. The method of claim 9, further comprising:
forming a second reflecting structure at the second end of the waveguide; and
forming a receiver at the second end of the waveguide.

12. The method of claim 9, wherein forming a waveguide further comprises:
forming at least two elongate light reflecting barriers that are each disposed along the waveguide between the first end and the second end.

13. A method of distributing an optical clocking signal comprising:
providing an electrical device, the electrical device comprising substrate; a back surface and a front surface that are parallel planar; and a dielectric layer disposed upon the front surface;
transmitting an optical clocking signal into the electrical device through a recess in the back surface and into the dielectric layer; and
deflecting the optical clocking signal with a reflecting structure disposed within the dielectric layer.

14. The method according to claim 13, wherein the reflecting structure distributes the optical clocking signal into a plurality of substantially equal-length optical clocking signal radiant energy paths to an equal plurality of receivers.

15. The method according to claim 13, wherein the optical clocking signal is a single optical clocking signal that is transmitted through the recess in the back surface of the substrate.

16. An electrical device comprising:
a substrate, wherein the substrate comprises a front surface and a back surface that are parallel planar, and wherein the substrate further comprises a through hole therein;
a dielectric layer disposed upon the front surface and over the through hole;
a first reflecting body disposed upon the front surface and comprising a first reflecting surface that is coplanar with the front surface;
a second reflecting body disposed adjacent the first reflecting body and comprising a second reflecting surface that is perpendicular to the to the first reflecting surface; and
a third reflecting body disposed adjacent the second reflecting surface and comprising a third reflecting surface that is parallel to the first reflecting surface, wherein the first, second, and third reflecting surfaces comprise a first optical reflector.

17. The electrical device according to claim 16, wherein the first and the third reflecting bodies are portions of metallization lines in an integrated circuit device wiring configuration, and wherein the second reflecting body is a metal silicide disposed between the first and third reflecting bodies.

18. The electrical device according to claim 16, further comprising:
a second optical reflector disposed within the dielectric layer and aligned with the first optical reflector, the second optical reflector comprising fourth, fifth, and sixth reflecting bodies, wherein the fourth and the sixth reflecting bodies are portions of metallization lines in the integrated circuit device wiring configuration that correspond to the first and third reflecting bodies, respectively, and wherein the fifth reflecting body is a metal silicide that corresponds to the second reflecting body.

19. A mirror in a microelectronic device comprising:
a plurality of alternatingly adjacent metal line and metal silicide materials disposed in an interlayer dielectric layer, that is disposed upon an active surface of a semiconductive substrate, wherein, the plurality of alternatingly adjacent metal line and metal silicide materials form a reflecting structure that is disposed at an angle that is oblique to the active surface.

20. The mirror in a microelectronic device according to claim 19, wherein the alternatingly adjacent metal line and metal silicide materials comprise a pyramid shaped structure.

21. The mirror in a microelectronic device according to claim 19, wherein the alternatingly adjacent metal line and metal silicide materials comprise a pyramid shaped structure, and wherein the alternatingly adjacent metal line and metal silicide materials comprise a series of graduated characteristic dimensions.

22. The mirror in a microelectronic device according to claim 19, wherein the pyramid shaped structure comprises a series of metallizations including at least Metal-1 through Metal-3.

23. An optical path system in an electrical device, the optical path system comprising:
- a first optical path section disposed between a light source and a first reflecting structure, wherein the first optical path section extends through a gas that is disposed in a recess in a substrate, and through a dielectric layer, wherein the substrate has a front surface and a back surface that are parallel planar, and wherein the first optical path section extends from the radiant energy source through the back surface;
- a second optical path section disposed within a waveguide having a first end and a second end, wherein the second optical path section is disposed between the first reflecting structure at the first end and the second end, wherein the second optical path section extends parallel to the front surface, through a portion of the dielectric layer; and
- a third optical path section disposed between the second end and a light receiver, wherein the third optical path section extends orthogonal to the first surface, through a portion of the dielectric layer.

24. The optical path system according to claim 23, wherein the second optical path section is disposed between the first reflecting structure at the first end and a second reflection structure at the second end, and wherein the third optical path section is disposed between the second reflecting structure and the light receiver.

* * * * *

UNITED STATES PATENT AND TRADEMARK OFFICE
CERTIFICATE OF CORRECTION

PATENT NO. : 6,351,576 B1
DATED : February 26, 2002
INVENTOR(S) : Ding

It is certified that error appears in the above-identified patent and that said Letters Patent is hereby corrected as shown below:

Column 5,
Line 32, delete "Fifth", insert -- fifth --.

Column 11,
Line 2, delete "IL,D", insert -- ILD --.
Line 11, delete "suicide", insert -- silicide --.

Signed and Sealed this

Twenty-seventh Day of August, 2002

Attest:

Attesting Officer

JAMES E. ROGAN
*Director of the United States Patent and Trademark Office*